United States Patent
Ishida et al.

(10) Patent No.: US 7,133,075 B2
(45) Date of Patent: Nov. 7, 2006

(54) IMAGE CAPTURING APPARATUS AND METHOD FOR REDUCING A FLICKER EFFECT

(75) Inventors: Kozo Ishida, Tokyo (JP); Tetsuya Kuno, Tokyo (JP); Koichi Yamashita, Tokyo (JP); Hiroaki Sugiura, Tokyo (JP); Takashi Itow, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 673 days.

(21) Appl. No.: 10/293,436

(22) Filed: Nov. 14, 2002

(65) Prior Publication Data

US 2003/0234873 A1    Dec. 25, 2003

(30) Foreign Application Priority Data

Jun. 19, 2002  (JP) ............................ 2002-178300

(51) Int. Cl.
 *H04N 3/14* (2006.01)
(52) U.S. Cl. ................ 348/312; 348/226.1; 348/227.1; 348/241; 348/311
(58) Field of Classification Search ................ 348/302, 348/311, 312, 317, 320, 322, 226.1, 227.1, 348/228.1, 230.1, 241–251
See application file for complete search history.

(56) References Cited

U.S. PATENT DOCUMENTS 3,858,967 A * 1/1975 O'Donnell ................... 352/38
3,982,826 A * 9/1976 Saito ........................... 352/14
4,460,836 A    7/1984 Tsunekawa et al.
6,147,706 A   11/2000 Inuiya et al.
6,522,352 B1 * 2/2003 Strandwitz et al. ...... 348/211.2
6,614,477 B1 * 9/2003 Lee et al. .................... 348/312
6,785,027 B1 * 8/2004 Ozumi ........................ 358/513

FOREIGN PATENT DOCUMENTS

| EP | 0 975 132 A1 | 1/2000 |
|---|---|---|
| JP | 52-122039 | 10/1977 |
| JP | 62-232278 A | 10/1987 |
| JP | 6-38078 A | 2/1994 |
| JP | 11-341343 A | 12/1999 |

* cited by examiner

*Primary Examiner*—Vivek Srivastava
*Assistant Examiner*—Chriss S. Yoder
(74) *Attorney, Agent, or Firm*—Birch, Stewart, Kolasch & Birch, LLP (57) ABSTRACT

An image capture apparatus which is compact and structurally simple and allows for prevention of a flicker noise, a method of capturing an image which allows for prevention of a flicker noise, and a mobile terminal using the apparatus and the method, are provided. In the image capture apparatus, a vertical cycle is adjusted so as to maintain 20 fps or 20/2m (m is an integer) fps, thereby to prevent a flicker noise in an image as obtained. To this end, in the image capture apparatus, a frequency of a horizontal transfer clock, a horizontal count level and a vertical line count level may be adjusted. Further, a fraction count is provided to adjust the length of one vertical cycle. Moreover, the image capture apparatus may be incorporated in a mobile terminal.

8 Claims, 11 Drawing Sheets

IMAGE CAPTURING APPARATUS AND METHOD FOR REDUCING A FLICKER EFFECT

This nonprovisional application claims priority under 35 U.S.C. § 119(a) on patent application Ser. No. 2002-178300 filed in JAPAN on Jun. 19, 2002, which is herein incorporated by reference.

BACKGROUND OF THE INVENTION

1. Field of the Invention

The present invention relates to an image capture apparatus which allows for prevention of a flicker noise, more particularly to a compact image capture apparatus which is suitably combined with a mobile terminal such as an information technology equipment or a mobile phone.

2. Description of the Background Art

As generally known, an image of one subject which is captured under illumination provided using an alternating current (ac) power is liable to contain a flicker noise in an image signal thereof. One conventional solution to correct such a flicker noise is as disclosed in Japanese Patent Application Laid-Open No. 52-122039, for example. This reference discloses a method as follows. First, a waveform having a phase reverse to that of a flicker noise is obtained by synthesizing a vertical scanning frequency of an image capture apparatus and an ac power frequency while synchronizing the frequencies to each other. Next, the obtained waveform is superposed on an image signal containing the flicker noise. In this manner, the flicker noise contained in the image signal can be eliminated.

Alternatively, a conventional image capture apparatus including a circuit functioning to eliminate a flicker noise is as disclosed in Japanese Patent Application Laid-Open No. 6-038078, for example. In the image capture apparatus disclosed in this reference, a signal level of an image signal actually output from an imaging device (hereinafter also referred to as a "CCD imaging device") is compared with a reference signal level of an image signal to be obtained by capturing an image using the CCD device in an appropriate (reference) exposure time, to find a difference between an actual exposure time and the reference exposure time. Next, calculation is carried out using two data of: data of the reference exposure time which corresponds to an exposure time of one cycle before a cycle where a flicker noise is caused due to a difference between a vertical scanning cycle actually employed in the image capture apparatus and a variation cycle of change in light intensity of illumination provided to a subject; and data of the difference between the actual exposure time and the reference exposure time. As a result of the calculation, a new exposure time to be set in the CCD imaging device is determined. Further, data of a drive timing is obtained in order to implement the new exposure time to be set. On the other hand, the image capture apparatus is provided with an oscillator for generating a pulse occurring plural times at constant intervals which are counted by a counter. Then, the counted times of the pulse and the data of a drive timing are compared with each other by a comparator, to detect a coincidence point at which any of the counted times of the pulse coincides with any value of the data of a timing for driving. Thereafter, in the image capture apparatus, an information about an optical image of the subject is stored in the CCD imaging device during a period of time from the coincidence point to a point at which a stored charge is read out during a vertical retrace period.

In this manner, the conventional image capture apparatus eliminates the flicker noise contained in the output image signal.

In accordance with the above-described conventional method of correcting a flicker noise which is disclosed in the first-cited reference, a waveform having a phase reverse to that of the flicker noise is obtained by synthesizing and synchronizing operations, which requires detection of an ac power frequency. For this reason, there is a need of additionally providing a device for detecting an ac power frequency in an image capture apparatus employing the conventional method. This complicates a structure of the image capture apparatus, as well as increases the size thereof.

On the other hand, in accordance with the above-described conventional image capture apparatus which is disclosed in the second-cited reference, a signal level of an image signal actually output from a CCD imaging device is compared with a reference signal level of an image signal to be obtained by capturing an image using the CCD element in an appropriate (reference) exposure time, to find a difference between an actual exposure time and the reference exposure time. Such procedure together with the other procedures is so complicated as to necessitate an additional process time for eliminating a flicker noise.

SUMMARY OF THE INVENTION

It is an object of the present invention to provide an image capture apparatus which is compact, structurally simple and is capable of preventing a flicker noise, an image capture method capable of preventing a flicker noise, and a mobile terminal using the apparatus and the method.

A first aspect of the present invention is intended for a method of capturing an image used in an image capture apparatus in which a length of one vertical cycle is variable. According to the first aspect of the present invention, the method includes the step of adjusting the length of one vertical cycle so as to maintain 20 fps or 20/2m (m is an integer) fps.

By adjusting the length of one vertical cycle so as to maintain 20 fps or 20/2m (m is an integer), it is possible to prevent a flicker noise without fail.

According to a second aspect of the present invention, an image capture apparatus includes an imaging device, a vertical line counter, a horizontal pixel counter, and a driver. The imaging device photoelectrically converts an incident light which provides an image of a subject, to generate a charge. The vertical line counter generates a first count which defines a timing of transfer of the charge generated in the imaging device in a vertical direction. The horizontal pixel counter generates a second count which defines a timing of transfer of the charge generated in the imaging device in a horizontal direction. The driver outputs a control signal used for transferring the charge generated in the imaging device based on the first and second counts. At least one of the vertical line counter and the horizontal pixel counter generates a fraction count used for adjusting a length of one vertical cycle.

At least one of the vertical line counter and the horizontal pixel counter generates the fraction count used for adjusting a length of one vertical cycle. Accordingly, it is possible to prevent a flicker noise, as well as easily form the apparatus and make the apparatus compact.

These and other objects, features, aspects and advantages of the present invention will become more apparent from the following detailed description of the present invention when taken in conjunction with the accompanying drawings.

DESCRIPTION OF THE PREFERRED EMBODIMENTS

Below, the present invention will be described in detail with reference to a few preferred embodiments thereof as illustrated in the accompanying drawings.

First Preferred Embodiment

Figure 1:
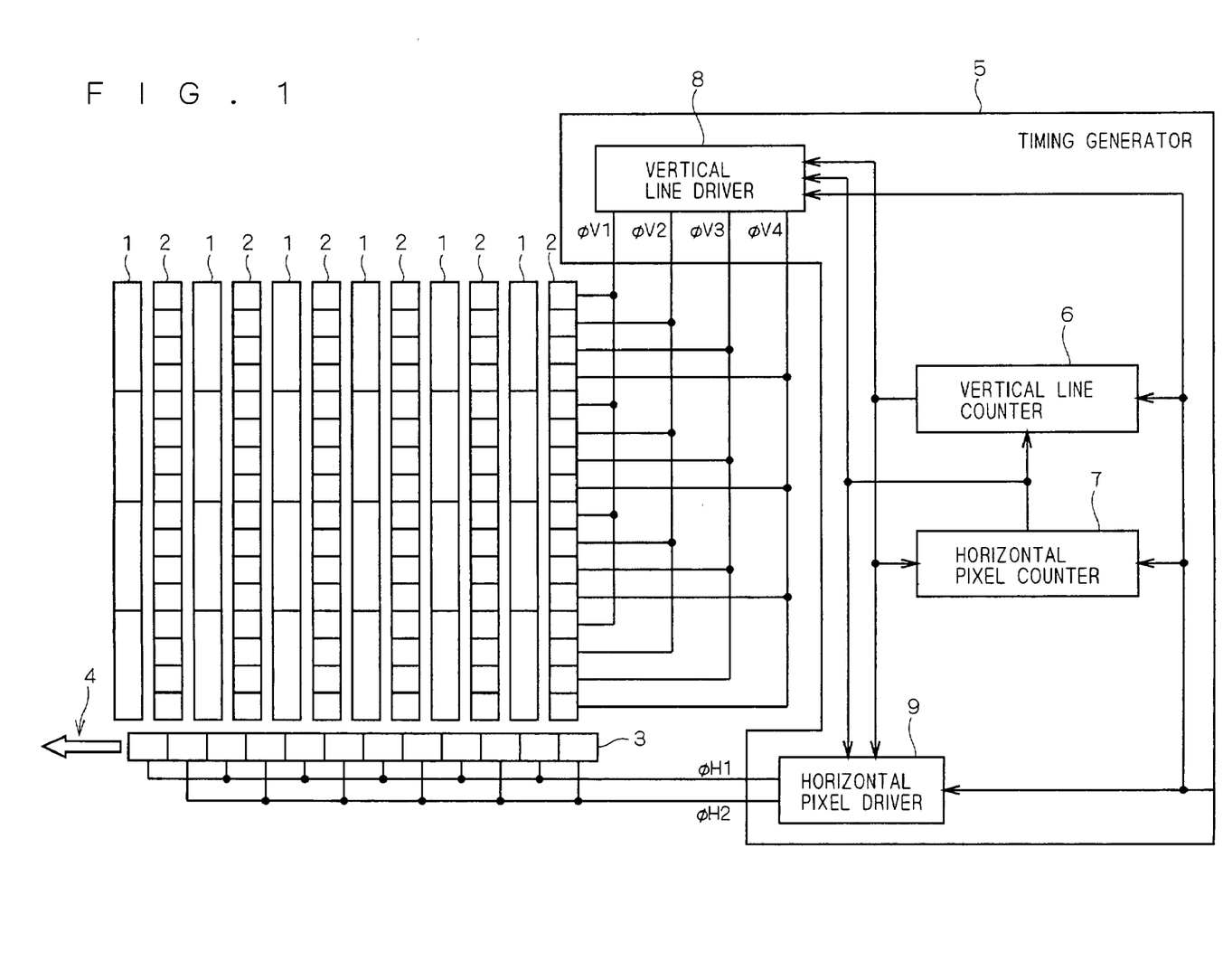
FIG. 1 is a diagrammatic view of a structure including an imaging device and a timing generator according to a first preferred embodiment of the present invention.

FIG. 1 is a diagrammatic view of a structure including an imaging device and a timing generator 5 according to a first preferred embodiment of the present invention. A plurality of photodiodes (PD) 1 function to photoelectrically convert an incident light which provides an image of a subject and take it out as a stored charge. The photodiodes 1 correspond to a plurality of pixels arranged along a horizontal line, respectively. The stored charge is read out by each of a plurality of vertical CCDs (charge coupled device) 2, to be transferred in a vertical direction. The stored charge is further transferred in a horizontal direction by horizontal CCDs 3, to then be output as a CCD output 4. A stored charge referred to is a charge generated by the imaging device.

The timing generator 5 controls transfer timings occurring for a period of time during which a stored charge is taken out from one of the photodiodes 1 and is output as the CCD output 4. The timing generator 5 is composed mainly of a vertical line counter 6, a horizontal pixel counter 7, a vertical line driver 8 and a horizontal pixel driver 9. The vertical line counter 6 generates a vertical line count (first count) which defines a timing of transfer of a stored charge in the vertical direction. The horizontal pixel counter 7 generates a horizontal pixel count (second count) which defines a timing of transfer of a stored charge in the horizontal direction. The vertical line driver 8 generates vertical transfer clocks $\phi$ V1 through $\phi$ V4 used for driving the vertical CCDs (VCCDs) 2, based on the vertical line count and the horizontal pixel count generated by the vertical line counter 6 and the horizontal pixel counter 7, respectively. The horizontal pixel driver 9 generates horizontal transfer clocks $\phi$ H1 and $\phi$ H2 used for driving the horizontal CCDs 3, based on the vertical line count and the horizontal pixel count generated by the vertical line counter 6 and the horizontal pixel counter 7, respectively. An image capture apparatus according to the first preferred embodiment of the present invention includes the foregoing imaging device.

When a fluorescent lamp is employed for illuminating a subject, as it is general that the fluorescent lamp is lighted up using a commercial power, the light intensity thereof varies at twice the frequency of an ac power. For this reason, an image of a subject captured under illumination provided by a fluorescent lamp is liable to be flickered. This phenomenon is called a flicker noise. For example, when the commercial power has a frequency of 50 Hz (so that the length of a cycle is a 1/50 second), the frequency of a flicker noise is 100 Hz (so that the length of a cycle is a 1/100 second) which is equal to twice the frequency of the commercial power.

Figure 2A:
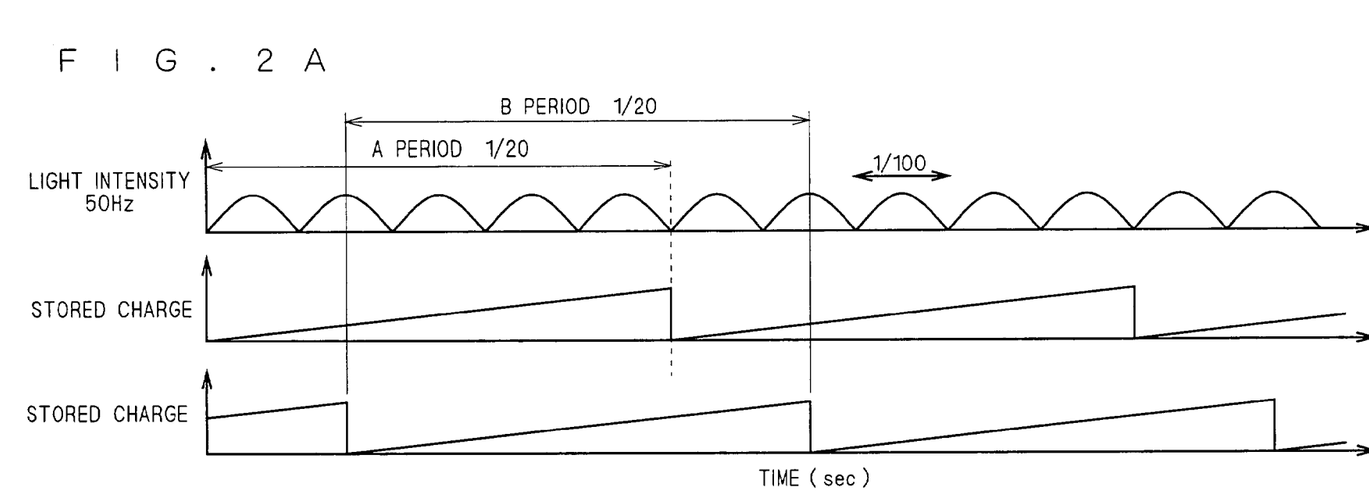
FIGS. 2A and 2B are conceptual views each illustrating a change in a light intensity of illumination and a change in a stored charge of an image capture apparatus according to the first preferred embodiment of the present invention.
Figure 2B:
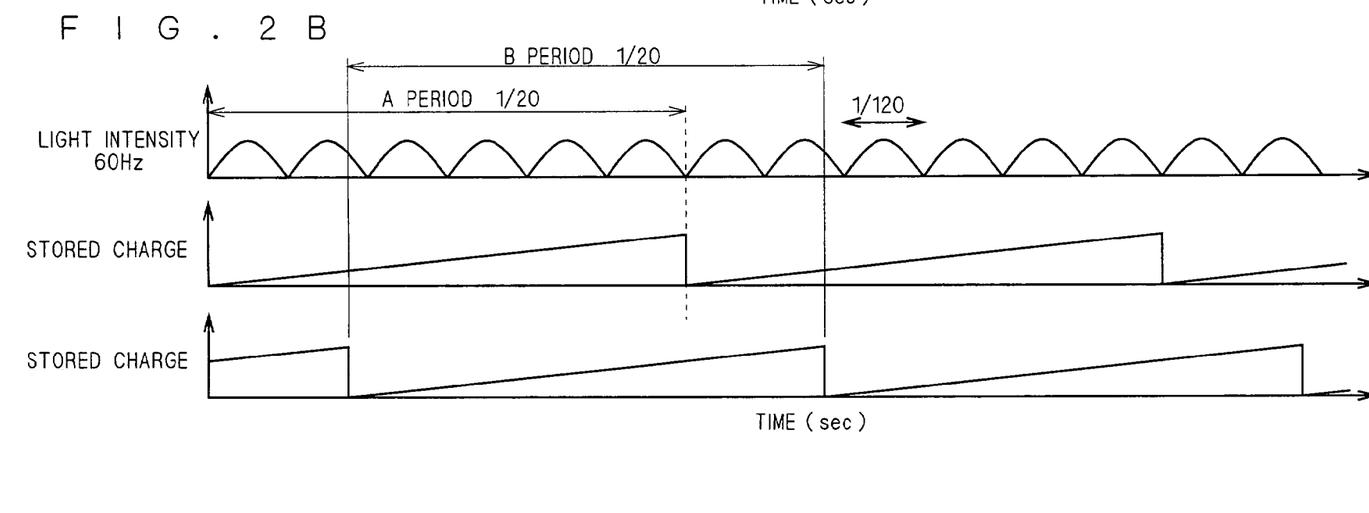

FIGS. 2A and 2B are conceptual views each illustrating a change in a light intensity of the illumination and a change in a stored charge of the image capture apparatus. In each of graphs shown in FIGS. 2A and 2B, a lateral axis represents a time (second), while a longitudinal axis represents a light intensity of illumination and an amount of a stored charge. FIG. 2A illustrates a situation where the commercial power has a frequency of 50 Hz (so that the length of a cycle is a 1/50 second), while FIG. 2B illustrates a situation where the commercial power has a frequency of 60 Hz (so that the length of a cycle is a 1/60 second).

First, consider the situation where the commercial frequency has a frequency of 50 Hz (so that the length of a cycle is a 1/50 second). In this situation, the light intensity of illumination varies at a frequency of 100 Hz (i.e., in a 1/100-second cycle) as illustrated in FIG. 2A. On the other hand, the image capture apparatus stores a charge during one vertical cycle and outputs the stored charge to one of the vertical CCDs 2 per cycle. Hence, if the number of peaks occurring in variation of the light intensity of the illumination differs from one cycle to another cycle, an amount of a stored charge will vary correspondingly. As a result, a flicker noise is superposed on an image as captured. In order to prevent the flicker noise, the length of one vertical cycle is adjusted so as to allow each vertical cycle to contain the same number of peaks of variation of the light intensity of the illumination. If the length of one vertical cycle is set so as to maintain 20 fps (frames per second), the number of peaks of variation of the light intensity of the illumination during an A period is 5, and the number of peaks of variation of the light intensity of the illumination during a B period is 5, as illustrated in FIG. 2A. As such, by setting the length of one vertical cycle so as to maintain 20 fps (so that the length of one cycle is a 1/20 second), it is possible to prevent the flicker noise caused in the captured image because the same amount of charge is stored in each of the A and B periods.

Next, consider another situation where the commercial power has a frequency of 60 Hz (so that the length of a cycle is a 1/60 second). The light intensity of illumination varies at a frequency of 120 Hz (i.e., in a 1/120-second cycle), as illustrated in FIG. 2B. Also in this situation, if the length of one vertical cycle is set so as to maintain 20 fps (so that the length of a cycle is a 1/20 second), the number of peaks of variation of the light intensity of illumination during the A period is 6, and the number of peaks of variation of the light intensity of illumination during the B period is 6, as illustrated in FIG. 2B. Accordingly, by setting the length of one vertical cycle so as to maintain 20 fps (so that the length of a cycle is a 1/20 second), it is possible to prevent the flicker noise caused in the captured image because the same amount of charge is stored in each of the A and B periods.

Thus, when the length of one vertical cycle is set so as to maintain 20 fps in the image capture apparatus, the same amount of a charge is stored not only in each of the A and B periods but also in any arbitrary period, which allows for prevention of a flicker noise from the captured image. Further, also when the length of one vertical cycle is set so as to maintain 20/2m (m is an integer) fps, the same amount of a charge is stored in each of vertical cycles thereby to prevent a flicker noise in the captured image.

It is noted that one vertical cycle of the image capture apparatus is set such that a frame rate (Ft) of the image capture apparatus satisfies a relationship given by the following equation: $Ft=fclk/(Nh1 \times Nv)$ where "fclk" is a frequency of the horizontal transfer clock which is one of system frequencies used in the image capture apparatus, "Nh1" is a horizontal pixel count level (also referred to as a "maximum horizontal pixel count number"), and "Nv" is a vertical line count level (also referred to as a "maximum vertical line count number"). The horizontal pixel count level is a level which the horizontal pixel count is to reach, where the horizontal pixel count stops progressively advancing and is reset. The horizontal pixel count level is determined by summing the number of effective horizontal pixels, the number of horizontal optical black pixels (hereinafter, referred to as "horizontal OB pixels") and the number of horizontal blanking intervals. The vertical line count level is a level which the vertical line count is to reach, where the vertical line count stops progressively advancing and is reset. The vertical line count level is determined by summing the number of effective vertical pixels, the number of vertical optical black pixels (hereinafter referred to as "vertical OB pixels") and the number of vertical blanking intervals.

In the image capture apparatus according to the first preferred embodiment, the length of one vertical cycle is adjusted so as to maintain either 20 fps or 20/2m (m is an integer) fps, thereby to prevent a flicker noise in an image as captured. To accomplish this, the frequency fclk of the horizontal transfer clock, the horizontal pixel count level Nh1 and the vertical line count level Nv are adjusted. Even if one of those parameters, the frequency fclk of the horizontal transfer clock, for example, is changed, it is possible to keep the length of one vertical cycle so as to maintain either 20 fps or 20/2m (m is an integer) by controlling the other parameters.

If illuminance is reduced during a process of capturing image, an attempt to increase a stored charge is made in order to increase an SN ratio. At that time, the length of a vertical cycle is reduced, to provide for reduction in illuminance. In practical use, illuminance varies in the image capture apparatus according to a state of image capture, i.e., according to whether image capture is carried out indoors or outdoors. This can cause the length of a vertical cycle to vary. On this occasion, by adjusting the length of the vertical cycle so as to maintain either 20 fps or 20/2m (m is an integer) fps, it is possible to prevent a flicker noise in an image as captured.

Further, in order to flexibly adjust the length of one vertical cycle, a fraction count for adjusting the length of one vertical cycle can be provided, in addition to the above described parameters. The fraction count is generated by the vertical line counter and the horizontal pixel counter. By varying a fraction count level (also referred to as a "maximum fraction count number") which the fraction count is to reach, where the fraction count stops progressively advancing and is reset, it is possible to adjust the length of one vertical cycle. Below, the adjustment of the length of a vertical cycle using the fraction count will be described in detail.

Figure 3:
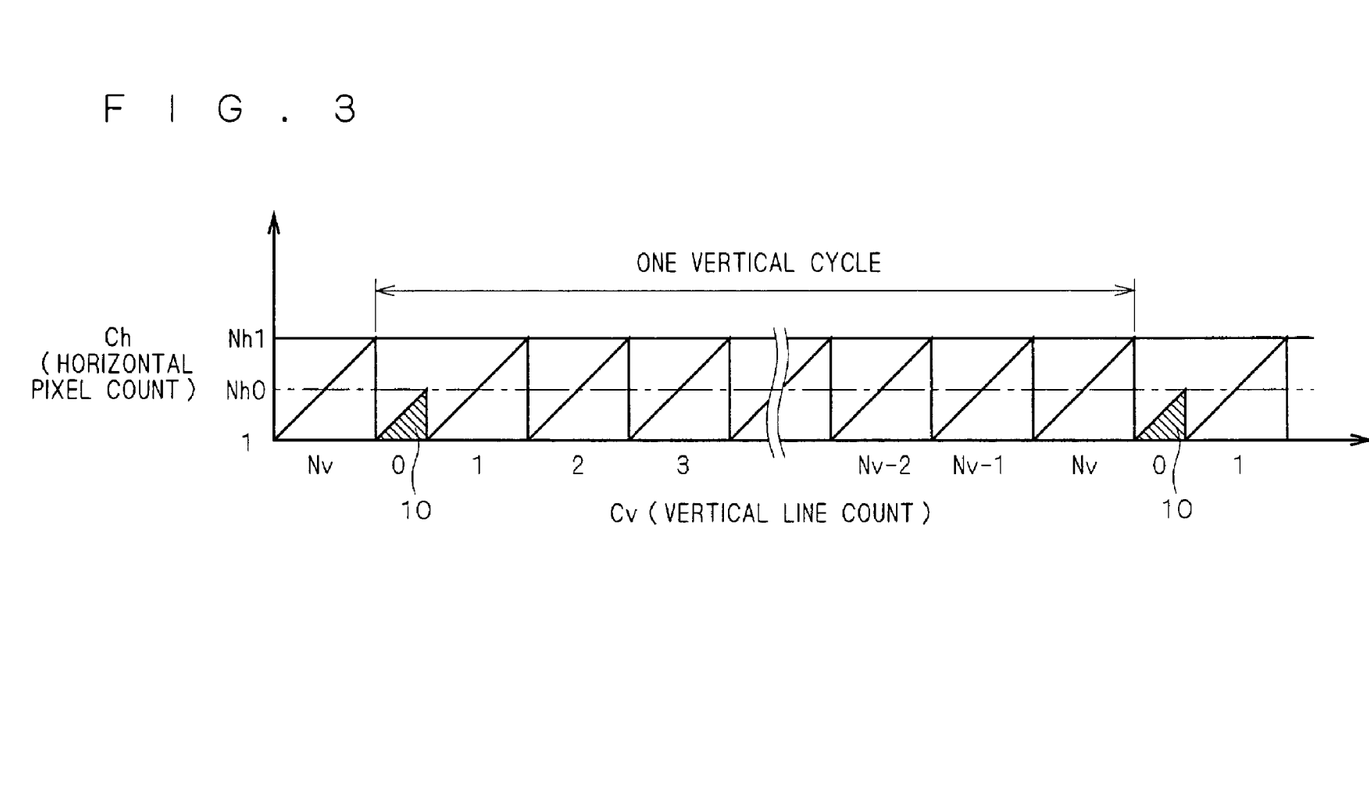
FIG. 3 is a schematic view illustrating counts generated by a vertical line counter and a horizontal pixel counter according to the first preferred embodiment of the present invention.

FIG. 3 is a schematic view illustrating the counts including the fraction count generated by the vertical line counter 6 and the horizontal pixel counter 7. First, while a vertical line count Cv (which may be hereinafter abbreviated as a "count Cv") generated by the vertical line counter 6 is 0 (i.e., in a stage of 0), a horizontal pixel count Ch (which may be hereinafter abbreviated as a "count Ch") generated by the horizontal pixel counter 7 advances from 1 to a horizontal pixel count level Nh0. When the count Ch reaches the horizontal pixel count level Nh0, the count Cv advances by one and the count Ch returns to 1. Then, the count Cv enters a stage of 1, and the count Ch generated by the horizontal pixel counter 7 advances from 1 to another horizontal pixel count level Nh1. When the count Ch reaches the count level Nh1, the count Cv further advances by one and the count Ch again returns to 1. Then, the count Cv enters a stage of 2, and the count Ch1 generated by the horizontal pixel counter 7 advances from 1 to the horizontal pixel count level Nh1.

Thereafter, an analogous operation is repeated until the count Cv reaches the vertical line count level Nv. When the counts Cv and Ch reaches the count levels Nv and Nh1, respectively, the counts Cv and Ch return to 0 and 1, respectively. Additionally, each of the horizontal pixel count level Nh1, the vertical line count level Nv and the horizontal pixel count level Nh0 are levels which the horizontal pixel count, the vertical line count and the fraction count are to reach, where the respective counts stop progressively advancing and are reset as described above. As such, the respective count levels can be regarded as thresholds for initializing the respective counts. Moreover, one vertical cycle corresponds to a period from a point at which the counts Cv and Ch are 0 and 1, respectively, to a point at which the counts Cv and Ch reach the count levels Nv and Nh1, respectively.

A fraction count 10 is provided as the count Cv in a stage of 0, during which the count Ch advances from 1 to the count level Nh0. The fraction count 10 is provided for adjusting the length of one vertical cycle. As described above, the horizontal pixel count level Nh1 functions as a threshold for the count Ch except a stage corresponding to a stage of the fraction count 10, and is determined by summing the number of the effective horizontal pixels, the number of the horizontal OB pixels and the number of horizontal blanking intervals. On the other hand, the horizontal pixel count level Nh0 which functions as a threshold for the count Ch in a stage corresponding to the stage of the fraction count 10 is determined so as to adjust the length of one vertical cycle. Thus, in accordance with the first preferred embodiment of the present invention, by providing the fraction count 10 in one vertical cycle and varying the horizontal pixel count level Nh0 which functions as a threshold for the count Ch in a stage corresponding to the stage of the fraction count 10, the length of one vertical cycle is adjusted so as to prevent a flicker noise. As a result, even if conditions for capturing an image of a subject (the frequency of the commercial power, for example), or the system frequencies used in the image capture apparatus (the frequency of the horizontal transfer clock, for example) sequentially vary, it is possible to prevent a flicker noise by varying the horizontal pixel count level Nh0. In the image capture apparatus according to the first preferred embodiment, the horizontal pixel count level Nh0 is controlled, thereby to set the length of one vertical cycle so as to maintain either 20 fps or 20/2m (m is an integer).

In the image capture apparatus according to the first preferred embodiment, the fraction count 10 is provided by increasing the vertical line count level. Accordingly, one vertical cycle of the image capture apparatus is set such that a frame rate (Ft) of the image capture apparatus is represented by the following equation: Ft=fclk/(Nh1×Nv+Nh0×1). As a result, even if the frequency of the horizontal transfer clock, the number of the effective horizontal/vertical pixels or the number of horizontal/vertical OB pixels arbitrarily differs, it is possible to prevent a flicker noise by varying or controlling the fraction count level (corresponding to the count level Nh0). Further, the image capture apparatus according to the first preferred embodiment is compact and can be formed with a simple structure.

In the above description of the image capture apparatus according to the first preferred embodiment, the fraction count 10 is provided only once per vertical cycle, as the count Cv which is 0. However, the number of times of providing the fraction count 10 is not limited to one, and the fraction count 10 can be provided plural times per cycle. For example, the fraction count 10 can be provided twice, as the count Cv which is –1 and the count Cv which is 0. In such an instance, the horizontal pixel count level which functions as the fraction count level is equal to a half of the count level Nh0. Further, in the above description of the image capture apparatus according to the first preferred embodiment, the fraction count 10 is provided in a front end of one vertical cycle. However, the present invention is not limited to that description. The fraction count can be provided in either the middle or a trail end of one vertical cycle.

Moreover, the above description of the image capture apparatus according to the first preferred embodiment has been made on the assumption that each of the vertical line counter 6 and the horizontal pixel counter 7 is of an "up counter" type. However, the counters 6 and 7 may be either of a "down counter" type, or a "gray cord counter" type. Also, the number of steps of each of the counters and a polarity of a trigger point of each of the horizontal transfer clock and the vertical transfer clock can be arbitrarily determined.

Modification

Below, a modification of the first preferred embodiment will be described.

According to the first preferred embodiment described above, the fraction count 10 is provided by increasing the vertical line count level as illustrated in FIG. 3. However, it is not necessarily required to increase the vertical line count level for providing the fraction count 10. The fraction count 10 can be provided only by increasing the horizontal pixel count level. Procedures therefor will be described in detail as follows.

Figure 4:
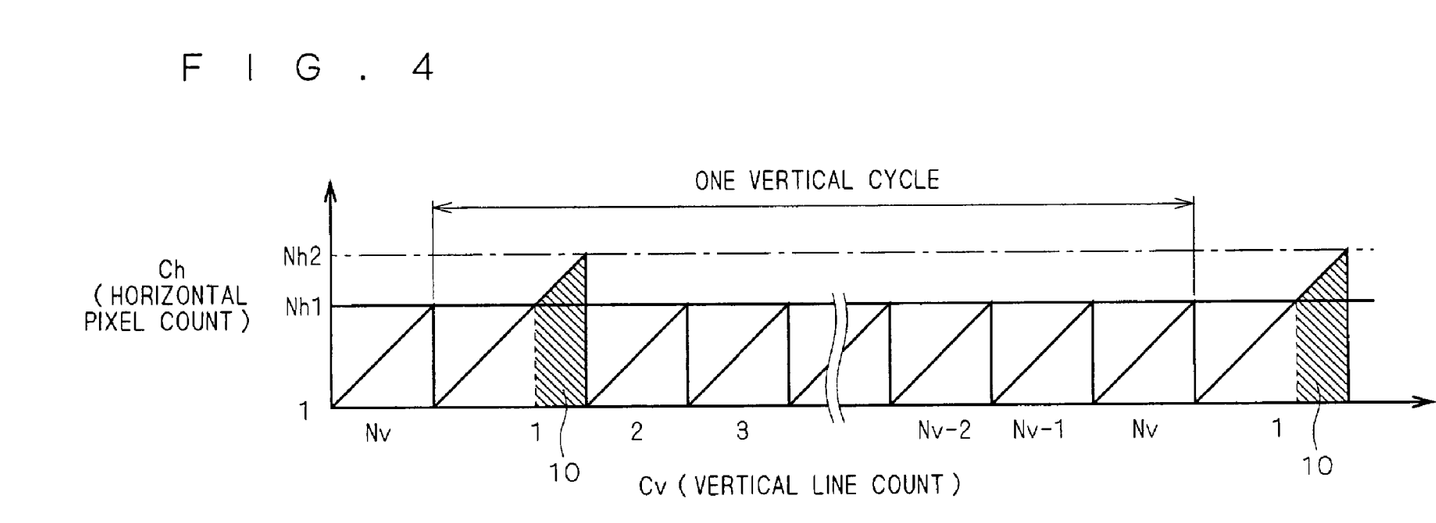
FIG. 4 is a schematic view illustrating counts generated by a vertical line counter and a horizontal pixel counter according to a modification of the first preferred embodiment of the present invention.

FIG. 4 is a diagrammatic view illustrating the counts generated by the vertical line counter 6 and the horizontal pixel counter 7 according to the present modification. First, while the count Cv generated by the vertical line counter 6 is 1 (i.e., in a stage of 1), the count Ch generated by the horizontal pixel counter 7 advances from 1 to a horizontal pixel count level Nh2. When the count Ch reaches the count level Nh2, the count Cv advances by one, and the count Ch returns to 1. Then, the count Cv enters a stage of 2, and the count Ch generated by the horizontal pixel counter 7 advances from 1 to the count level Nh1. When the count Ch reaches the count level Nh 1, the count Cv advances by one, and the count Ch returns to 1. Then, the count Cv enters a stage of 3, and the count Ch generated by the horizontal pixel counter 7 advances from 1 to the count level Nh1. Thereafter, an analogous operation is repeated until the count Cv reaches the vertical line count level Nv. When the counts Cv and Ch reach the count levels Nv and Nh1, respectively, each of the counts Cv and Ch returns to 1. Additionally, one vertical cycle corresponds to a period from a point at which each of the counts Cv and Ch is 1, to a point at which the counts Cv and Ch reach the count levels Nv and Nh, respectively.

The fraction count 10 is provided as a part of the count Cv in a stage of 1. During a stage corresponding to a stage of the count Cv including the fraction count 10, the count Ch advances from a count level Nh1+1 to the count level Nh2. The horizontal pixel count level Nh1 functions as a threshold for the count Ch except a stage corresponding to the stage of the count Cv including the fraction count 10, and is determined by summing the number of the effective horizontal pixels, the number of the horizontal OB pixels and the number of horizontal blanking intervals. On the other hand, the horizontal pixel count level Nh2 which functions as a threshold for the count Ch in a stage corresponding to a stage of the count Cv including the fraction count 10 is determined so as to adjust the length of a vertical cycle. Thus, in accordance with the present modification of the first preferred embodiment of the present invention, by providing the fraction count 10 in one vertical cycle and varying the horizontal pixel count level Nh2 which functions as a threshold for the count Ch in a stage corresponding to a stage of the count Cv including the fraction count 10, the length of one vertical cycle is adjusted so as to prevent a flicker noise. As a result, even if conditions for capturing an image of a subject (the frequency of the commercial power, for example), or the system frequencies used in the image capture apparatus (the frequency of the horizontal transfer clock, for example) sequentially vary, it is possible to prevent a flicker noise by varying the horizontal pixel count level Nh2. In an image capture apparatus according to the present modification of the first preferred embodiment, the horizontal pixel count level Nh2 is controlled, thereby to set the length of one vertical cycle so as to maintain either 20 fps or 20/2m (m is an integer).

In the image capture apparatus according to the present modification of the first preferred embodiment, the fraction count 10 is provided only by increasing the horizontal pixel line count level. Accordingly, one vertical cycle of the image capture apparatus is set such that a frame rate (Ft) of the image capture apparatus is represented by the following equation: Ft=fclk/(Nh1×(Nv−1)+Nh2×1). As a result, even if the frequency of the horizontal transfer clock, the number of the effective horizontal/vertical pixels or the number of horizontal/vertical OB pixels arbitrarily differs, it is possible to prevent a flicker noise by varying or controlling the fraction count level (corresponding to the count level Nh2). Further, the image capture apparatus according to the present modification of the first preferred embodiment is compact and can be formed with a simple structure.

In the above description of the image capture apparatus according to the present modification of the first preferred embodiment, the fraction count 10 is provided only once per vertical cycle, as a part of the count Cv in a stage of 1. However, the number of times of providing the fraction count is not limited to one. The fraction count 10 can be provided plural times per cycle. For example, the fraction count 10 can be provided twice, as a part of the count Cv which is 1 and as a part of the count Cv which is 2. In such an instance, the horizontal pixel count level for the count Ch in a stage corresponding to a stage of the count Cv including the fraction count 10 is equal to a half of a count level (Nh2−Nh1).

Second Preferred Embodiment

Figure 5:
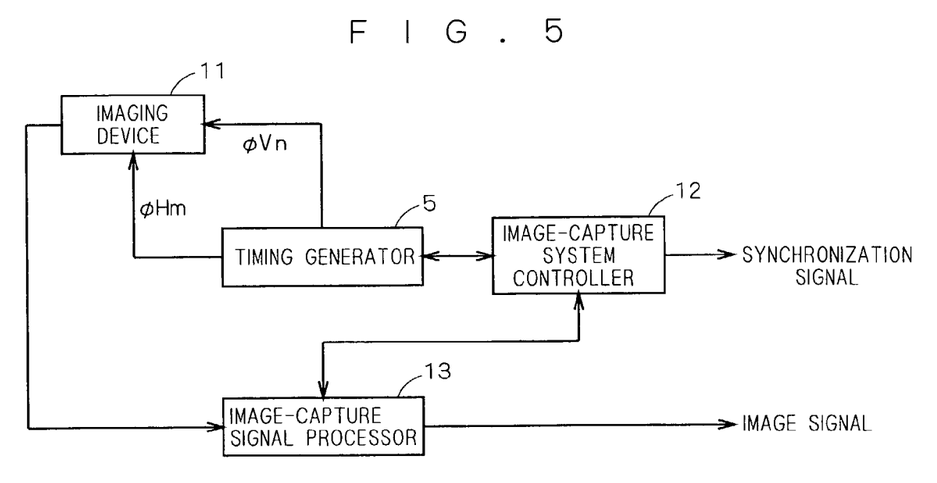
FIG. 5 is a diagrammatic view of a structure of an image capture apparatus according to a second preferred embodiment of the present invention.

FIG. 5 is a schematic view illustrating a structure of an image capture apparatus according to a second preferred embodiment of the present invention. An imaging device 11 illustrated in FIG. 5 is similar to the imaging device illustrated in FIG. 1, which includes the photodiodes 1, the vertical CCDs 2 and the horizontal CCDs 3. The imaging device 11 receives a vertical transfer clock φ Vn and a horizontal transfer clock φ Am from the timing generator 5, to transfer a stored charge. An image-capture system controller 12 provides a system frequency used in the image capture apparatus (hereinafter, also referred to as a "transfer clock") to the timing generator 5 and provides a synchronization signal to an exterior, thereby to control timings in the whole image capture apparatus. An image-capture signal processor 13 takes out an image signal from the CCD output received from the imaging device 11 in accordance with a control signal provided by the image-capture system controller 12.

Figure 6:
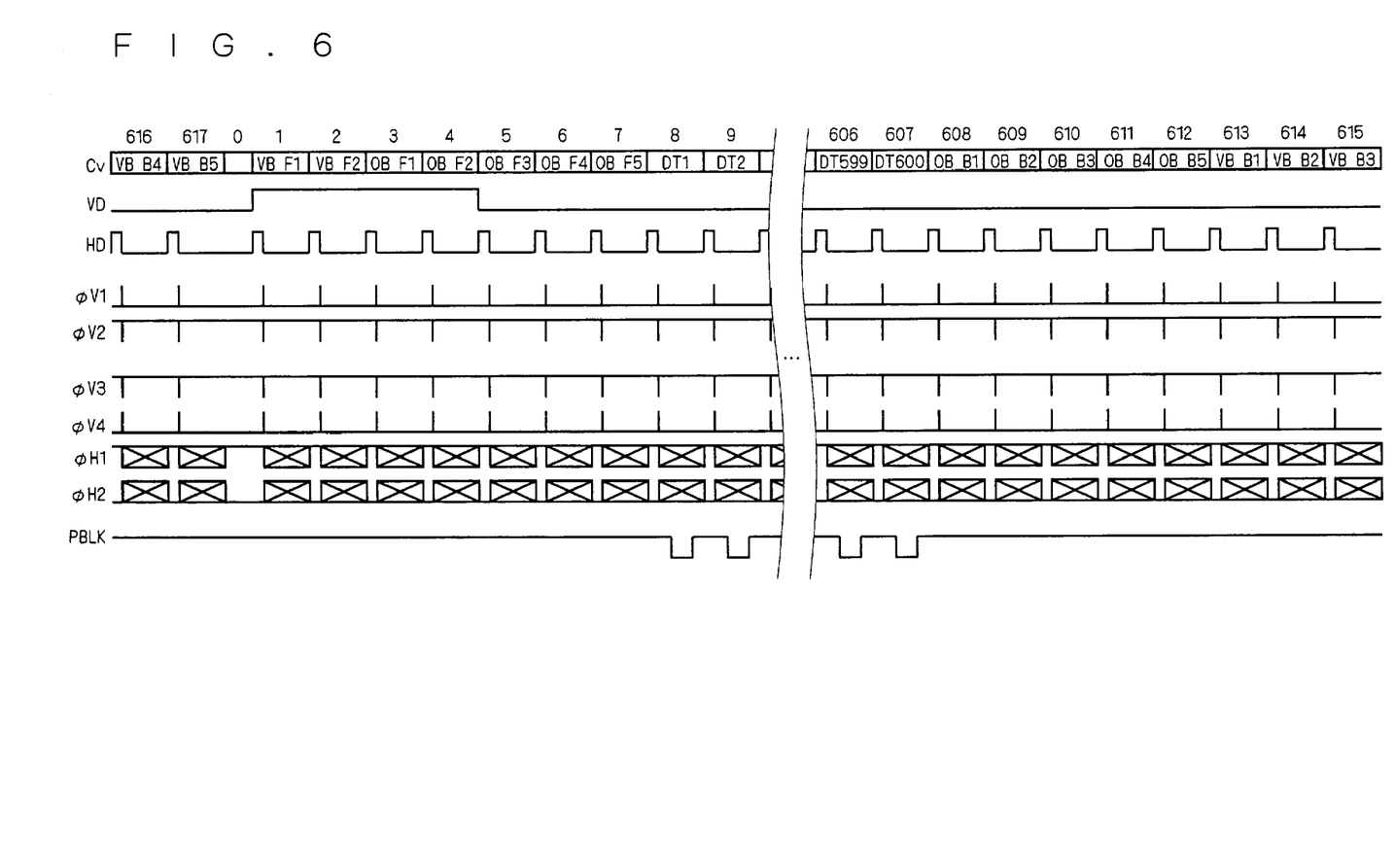
FIG. 6 is a timing chart for the image capture apparatus according to the second preferred embodiment of the present invention.

FIG. 6 is a timing chart for the image capture apparatus according to the second preferred embodiment of the present invention. Now, consider a situation where: the number of the effective horizontal pixels is 800; the sum of the number of the horizontal OP pixels and the number of the horizontal blanking intervals is 10; the number of the effective vertical pixels is 600; the number of the vertical OB pixels is 10; the number of the vertical blanking intervals is 7; and the frequency of the horizontal transfer clock is 5 MHz.

FIG. 6 shows the vertical line count Cv generated by the vertical line counter 6 during one vertical cycle. A stage when the count Cv is 0 corresponds to a stage of the fraction count 10. During a stage when the count Cv is 2, a stored charge is read out from one of the photodiodes 1 to one of the vertical CCDs 2. A stage VB F1 indicates a period in which the first one of the blanking intervals included in a stage preceding to the stage VB F1 is selected. A stage OB F1 indicates a period in which the first one of the optical black (OB) pixels included in a preceding stage is selected. A stage DT1 indicates a stage in which the first one of effective pixels is selected. A stage OB B1 indicates a period in which the first one of the optical black (OB) pixels included in a subsequent stage is selected. A stage VB B1 indicates a period in which the first one of the blanking intervals included in a subsequent stage is selected.

A vertical synchronization signal VD and a horizontal synchronization signal HD indicate timings at which signals input to the image capture apparatus in the vertical and horizontal directions are synchronized to each other. Also, the vertical transfer clocks φ V1 through φ V4 function as control signals for transferring a charge stored in the imaging device 11. The horizontal transfer clocks φ H1 and φ H2 function as control signals for transferring a charge which has been transferred in the vertical direction in the horizontal direction. PBLK is a signal pulse indicating a period during which a signal is being received from the effective pixels.

In the image capture apparatus according to the second preferred embodiment, a control signal for the vertical transfer clocks φ V1 through φ V4 and the horizontal transfer clocks φ H1 and φ H2 is not output in the stage of the fraction count 10 (when the count Cv is 0). This eliminates a need of providing a specific control signal used in the stage of the fraction count 10 (when the count Cv is 0). To merely output a control signal for the vertical transfer clocks φ V1 through φ V4 and the horizontal transfer clocks φ H1 and φ H2 in a cyclic manner in stages (when the count Cv>1) other than the stage of the fraction count 10 will suffice to have the image capture apparatus properly operate. Further, it becomes possible to change an output control signal for the vertical transfer clocks φ V1 through φ V4 and the horizontal transfer clocks φ H1 and φ H2 in accordance with each stage of the count Cv generated by the vertical line counter 6. Accordingly, operations in the stage of the fraction count 10 can be performed independently of operations in the other stages.

As a result of the above arrangement, the vertical line count level Nv is 617, the horizontal pixel count level Nh1 is 810, and the frequency folk of the horizontal transfer clock is 5 MHz in the image capture apparatus according to the second preferred embodiment. Then, assuming that the horizontal pixel count level Nh0 for the stage of the fraction count 10 (when the count Cv is 0) is 230, one vertical cycle of the image capture apparatus is set such that a frame rate (Ft) of the image capture apparatus is calculated as Ft=5× $10^6$/(810×617+230×1)=10 fps, using the equation shown in the first preferred embodiment, Ft=fclk/(Nh1×Nv+Nh0×1). This means that the second preferred embodiment makes it possible to obtain an image capture apparatus which is free from a flicker noise and capable of driving the imaging device 11 having 800×600-effective pixels at a frame rate of 10 fps.

Further, by causing the horizontal transfer clocks φ H1 and φ H2 to pause in the stage when the count Cv is 2 for reading out a charge, it becomes possible to prevent a transferred charge from being affected by a noise due to a pulse for reading out. Moreover, though the above description for the second preferred embodiment refers to a structure where the horizontal transfer clocks φ H1 and φ H2 clocks are not output in the stage when the count Cv is 0, the horizontal transfer clocks φ H1 and φ H2 may be output in the stage where the count Cv is 0. In such an instance, the transfer clocks are allowed to be constantly operate throughout all the stages, which simplifies a structure for the image capture apparatus.

Third Preferred Embodiment

According to each of the above described first and second preferred embodiments, the fraction count level which the fraction count is to reach is changed/adjusted, thereby to provide an image capture apparatus free from a flicker noise. A third preferred embodiment of the present invention will describe an image capture apparatus which is provided with an electronic shutter function for implementing a high shutter speed, additionally to the image capture apparatus according to the first or second preferred embodiment.

Figure 7:
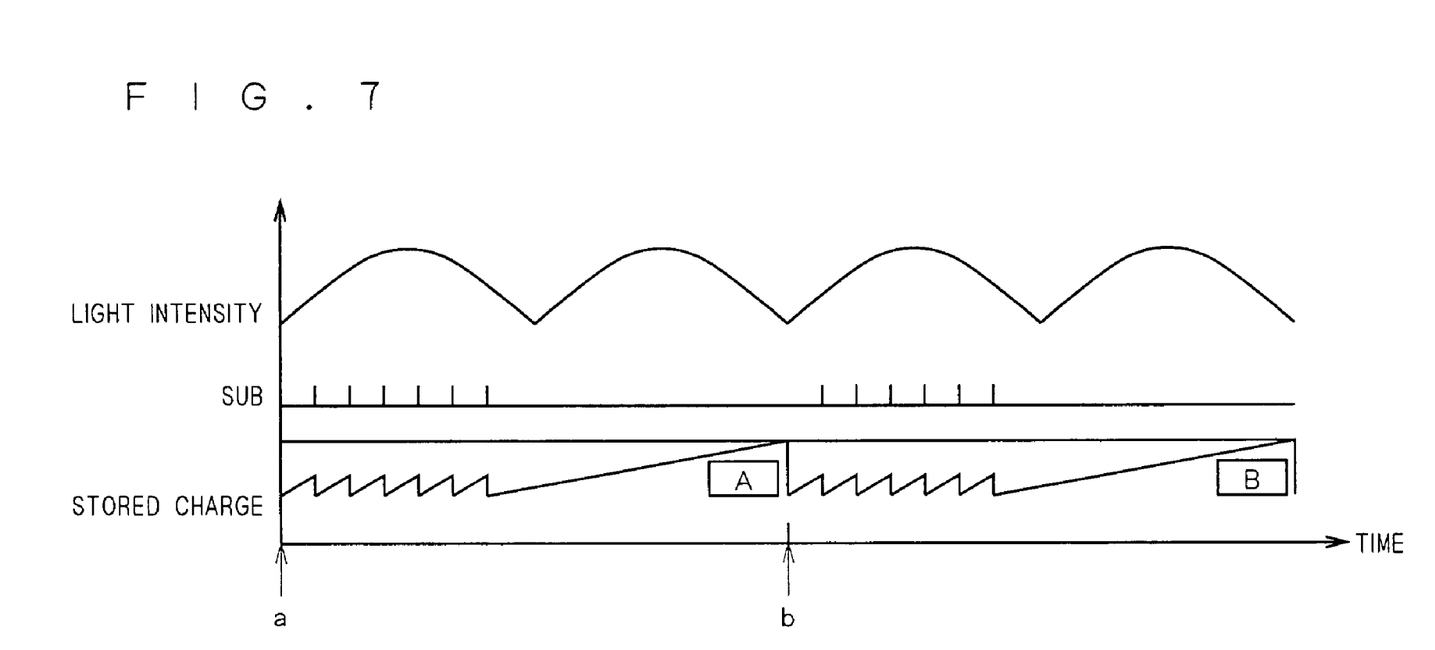
FIG. 7 is a conceptual view illustrating changes in a light intensity, a SUB pulse of an electronic shutter function and a stored charge in an image capture apparatus according to a third preferred embodiment of the present invention.

FIG. 7 is a conceptual view illustrating changes in a light intensity, a SUB pulse of the electronic shutter function and a stored charge in the image capture apparatus according to the third preferred embodiment. In FIG. 7, a lateral axis represents a time (second), while a longitudinal axis represents a light intensity, an amplitude of a pulse and an amount of a stored discharge. In the same manner as illustrated in FIG. 2, the light intensity of illumination varies at a frequency of twice the frequency of the commercial power. In the image capture apparatus according to the third preferred embodiment, a charge is stored in one of the photodiodes 1 of the imaging device 11 at a read-out timing a, and the stored charge is released upon application of the SUB pulse of the electronic shutter function. Thereafter, a charge is again stored in the photodiode 1 of the imaging device 11, to be again released upon application of the SUB pulse of the electronic shutter function.

In the image capture apparatus according to the third preferred embodiment, application of the SUB pulse of the electronic shutter function is used for releasing a stored charge, thereby to control a period of time for storing a charge in one vertical cycle. An amount of a charge stored during a period of time from the latest application of the SUB pulse of the electronic shutter function to the next read-out timing b corresponds to an amount of a charge stored as an image signal during one vertical cycle in the image capture apparatus.

Further, in the image capture apparatus according to the third preferred embodiment, the fraction count level is changed, to allow the SUB pulse of the electronic shutter function to be applied the same number of times per vertical cycle. Accordingly, the same amount of charge is stored as an image signal in each of vertical cycles in the image capture apparatus. For instance, the same amount of charge is stored during each of the A and B periods illustrated in FIG. 7.

Figure 8:
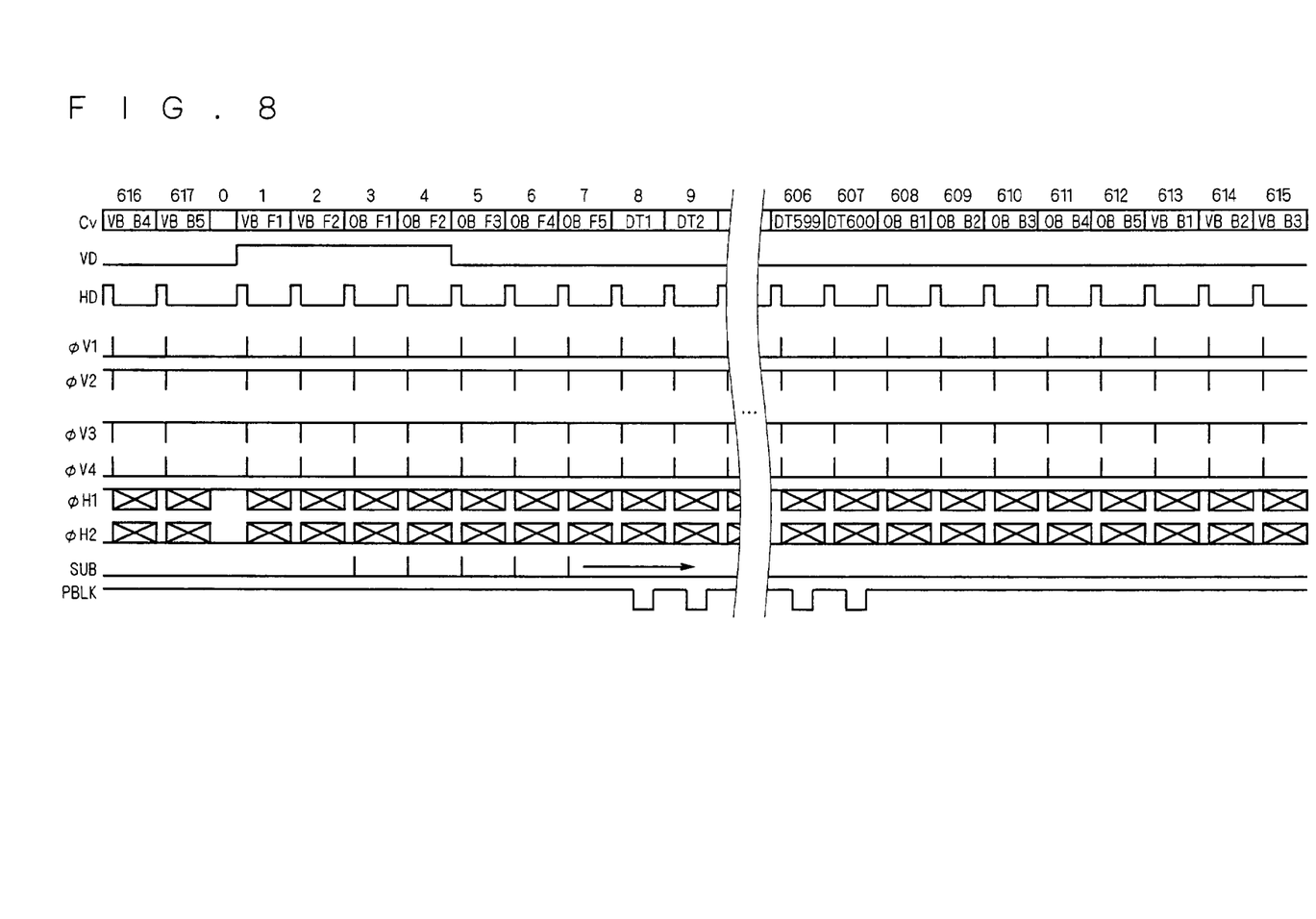
FIG. 8 is a timing chart for the image capture apparatus according to the third preferred embodiment of the present invention.

FIG. 8 is a timing chart for the image capture apparatus according to the third preferred embodiment of the present invention. Like the second preferred embodiment, FIG. 8 indicates the vertical line count Cv generated by the vertical line counter 6 during one vertical cycle. A stage when the count Cv is 0 corresponds to a stage of the fraction count 10. During a stage when the count Cv is 2, a stored charge is read out from one of the photodiodes 1 to one of the vertical CCDs 2. A stage VB F1 indicates a period in which the first one of the blanking intervals included in a preceding stage is selected. A stage OB F1 indicates a period in which the first one of the optical black (OB) pixels included in a preceding stage is selected. A stage DT1 indicates a stage in which the first one of effective pixels is selected. A stage OB B1 indicates a period in which the first one of the optical black (OB) pixels included in a subsequent stage is selected. A stage VB B1 indicates a period in which the first one of the blanking intervals included in a subsequent stage is selected.

A vertical synchronization signal VD and a horizontal synchronization signal HD indicates timings at which signals input to the image capture apparatus in the vertical and horizontal directions are synchronized to each other. Also, the vertical transfer clocks φ V1 through φ V4 function as control signals for transferring a charge stored in the imaging device 11. The horizontal transfer clocks φ H1 and φ H2 function as control signals for transferring a charge which has been transferred in the vertical direction in the horizontal direction. A clock SUB is the SUB pulse of the electronic shutter function used for releasing a charge stored in the photodiode 1 of the imaging device 11. PBLK is a signal pulse indicating a period during which a signal is being received from the effective pixels.

In the image capture apparatus according to the third preferred embodiment, the SUB pulse of the electronic shutter function is provided every time the count Cv advances after the stage when the count Cv is 2 for reading out a stored charge. In the image capture apparatus according to the third preferred embodiment, the number of times to provide the SUB pulse is controlled, thereby to control a period of time for storing a charge in the photodiode 1 of the imaging device 11. As the number of times to provide the SUB pulse increases, the period of time for storing a charge in the photodiode 1 of the imaging device 11 decreases. Conversely, by reducing the number of times to provide the SUB pulse, the period of time for storing a charge in the photodiode 1 of the imaging device 11 is increased.

It is noted that the period of time for storing a charge in the photodiode 1 of the imaging device 11 corresponds to a shutter speed of the image capture apparatus. Accordingly, in the image capture apparatus according to the third preferred embodiment, by changing the number of times to provide the SUB pulse of the electronic shutter function, it is possible to change the shutter speed. Additionally, the fraction count level is changed/adjusted also in the image capture apparatus according to the third preferred embodiment in the same manner as in the apparatus of the first or second preferred embodiment, so that the image capture apparatus according to the third preferred embodiment also allows for prevention of a flicker noise.

Modification

In the above described image capture apparatus according to the third preferred embodiment, a pulse of the electronic shutter clock SUB (the SUB pulse) is provided every time the vertical line count Cv advances after the stage when the count Cv is 2 for reading out a stored charge from the photodiode 1 to the vertical CCD 2. For this reason, a period for storing a charge in the photodiode 1 of the imaging device 11 can not be shorter than a period of time in one stage of one vertical line count. Accordingly, the shutter speed can not be shorter than a period of time of one stage of one vertical count.

Figure 9:
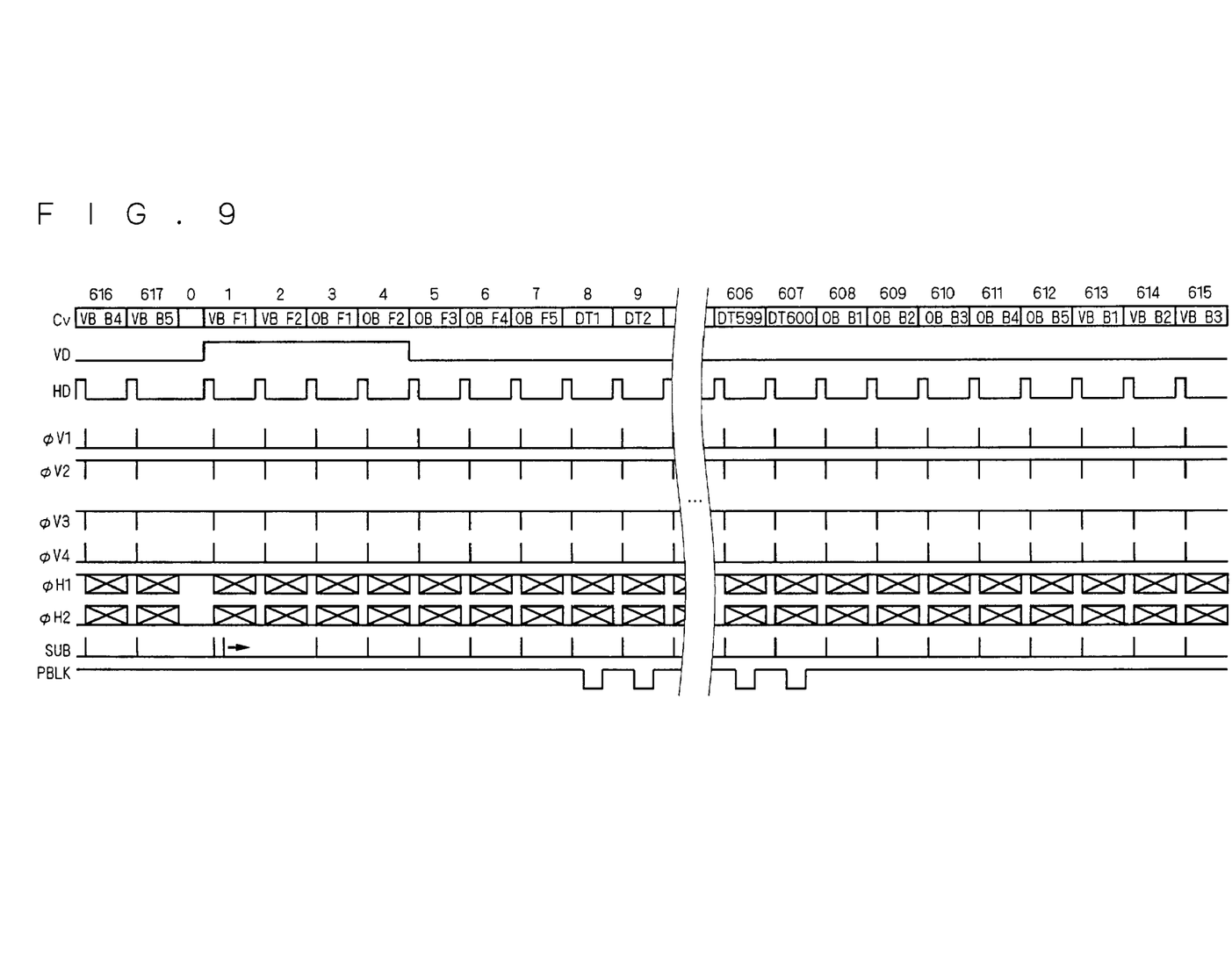
FIG. 9 is a timing chart for an image capture apparatus according to a modification of the third preferred embodiment of the present invention.

In contrast thereto, a modification of the third preferred embodiment allows for an ultrahigh shutter speed shorter than a period of time of one stage of one vertical count. FIG. 9 is a timing chart for an image capture apparatus according to the present modification of the third preferred embodiment of the present invention. Like the third preferred embodiment, FIG. 9 indicates the vertical line count Cv generated by the vertical line counter 6 during one vertical cycle. A stage when the count Cv is 0 corresponds to a stage of the fraction count 10. During a stage when the count Cv is 2, a stored charge is read out from one of the photodiodes 1 to one of the vertical CCDs 2.

A vertical synchronization signal VD and a horizontal synchronization signal HD indicates timings at which signals input to the image capture apparatus in the vertical and horizontal directions are synchronized to each other. Also, the vertical transfer clocks φ V1 through φ V4 function as control signals for transferring a charge stored in the imaging device 11. The horizontal transfer clocks φ H1 and φ H2 function as control signals for transferring a charge which has been transferred in the vertical direction in the horizontal direction. A clock SUB is the SUB pulse of the electronic shutter function for releasing a charge stored in the photodiode 1 of the imaging device 11. PBLK is a signal pulse indicating a period during which a signal is being received from the effective pixels.

The present modification differs from the third preferred embodiment in that the SUB pulse of the electronic shutter function is present in a stage when the vertical line count Cv is 1. According to the present modification of the third preferred embodiment, during a period of time from the last application of the SUB pulse of the electronic shutter function of the stage when the count Cv is 1 to the beginning of the stage when the count Cv is 2 for reading out a stored charge, a charge is stored in the photodiode 1 of the imaging device 11. The foregoing period of time corresponds to a shutter speed of the image capture apparatus of the present modification. As such, the image capture apparatus according to the present modification allows for reduction of the shutter speed to be shorter than one stage of one vertical count. Additionally, the fraction count level is changed/adjusted also in the image capture apparatus according to the present modification of the third preferred embodiment in the same manner as in the apparatus of the third preferred embodiment, so that the image capture apparatus according to the present modification also allows for prevention of a flicker noise.

Fourth Preferred Embodiment

A fourth preferred embodiment of the present invention relates to a terminal (such as PDA) or a mobile terminal (a mobile phone, for example) having a capability of radio communications, which is equipped with any of the image capture apparatuses according to the first through third preferred embodiments (including the modifications).

Figure 10:
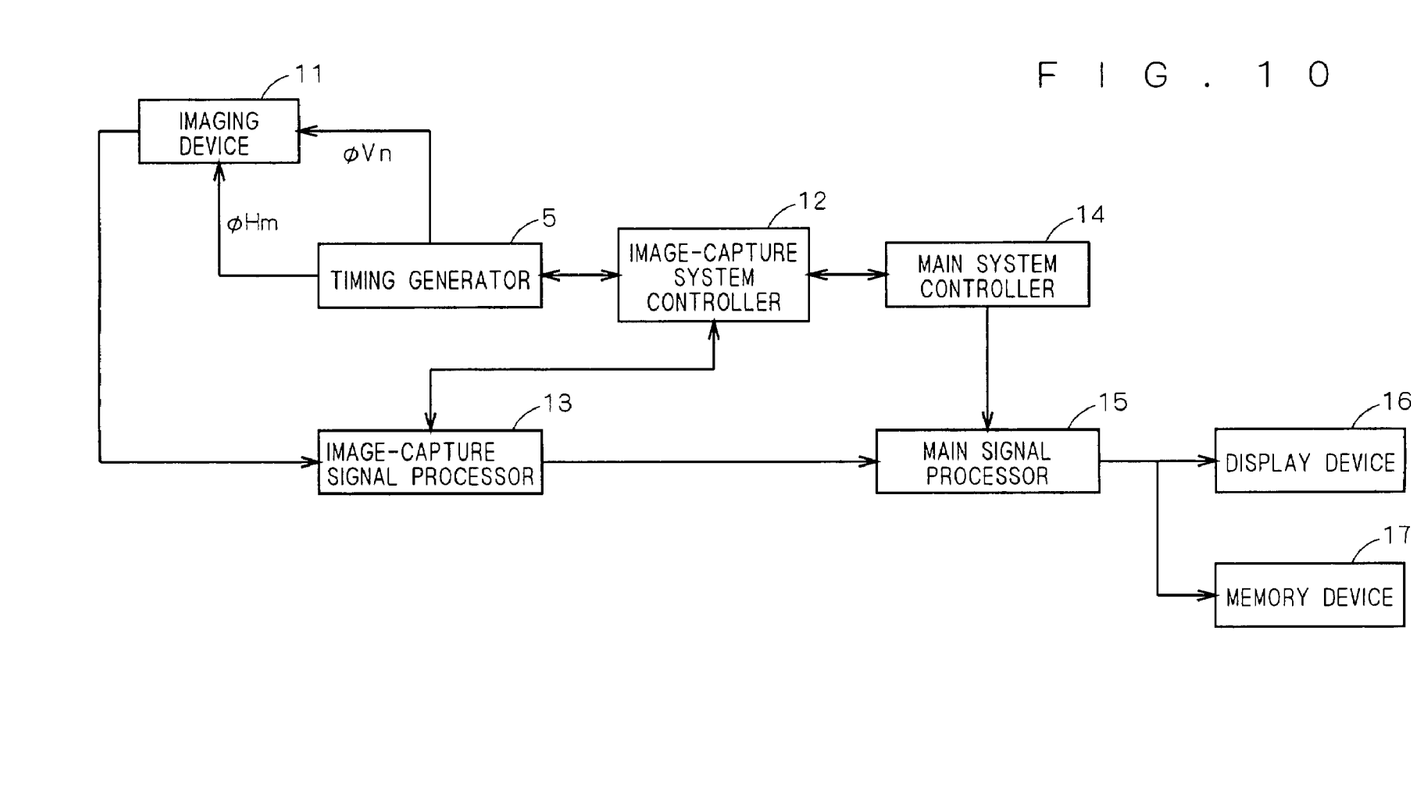
FIG. 10 is a block diagram illustrating an exemplary structure of a system using a mobile terminal according to a fourth preferred embodiment of the present invention.

FIG. 10 is a block diagram illustrating an exemplary structure of a system using the mobile terminal according to the fourth preferred embodiment of the present invention. In FIG. 10, each element which is identical to any of the elements of the image capture apparatus illustrated in FIG. 5 is denoted by the same reference numeral as used in FIG. 5. Elements newly added in FIG. 10 are: a main system controller 14; a main signal processor 15; a display device 16; and a memory device 17. The main system controller 14 controls the image-capture system controller 12, and controls a signal processing performed in the main signal processor 15. The main signal processor 15 processes an image signal received from the image-capture signal processor 13 so that the image signal can be displayed on the display device 16. The memory device 17 stores an image data received from the main signal processor 15 therein.

The image-capture system controller 12 of the image capture apparatus may possibly receive a request for change in any of the system frequencies used in the image capture apparatus (hereinafter, also referred to as a "transfer clock"). Procedures for changing initial values for the horizontal pixel count level Nh1, the vertical line count level Nv, the horizontal pixel count level Nh0 as the fraction count level or the like to comply with such request are standardized. Accordingly, it is possible to incorporate the image capture apparatus capable of preventing a flicker noise according to the first preferred embodiment of the present invention into an arbitrary mobile phone having a communications capability, so long as procedures for operating an image capture apparatus which are preset in the arbitrary mobile phone are identical to those of the image capture apparatus according to the first preferred embodiment of the present invention. Also, even if a transfer clock is changed in the mobile terminal having a communications capability, it is possible to obtain a mobile terminal having an image capture apparatus free from a flicker noise, by previously setting the horizontal pixel count level Nh0, the horizontal pixel count level Nh1 and the vertical line count level Nv per system frequency used in the image capture apparatus in the image-capture system controller 12 using the main system controller 14 of the mobile terminal.

Figure 11:
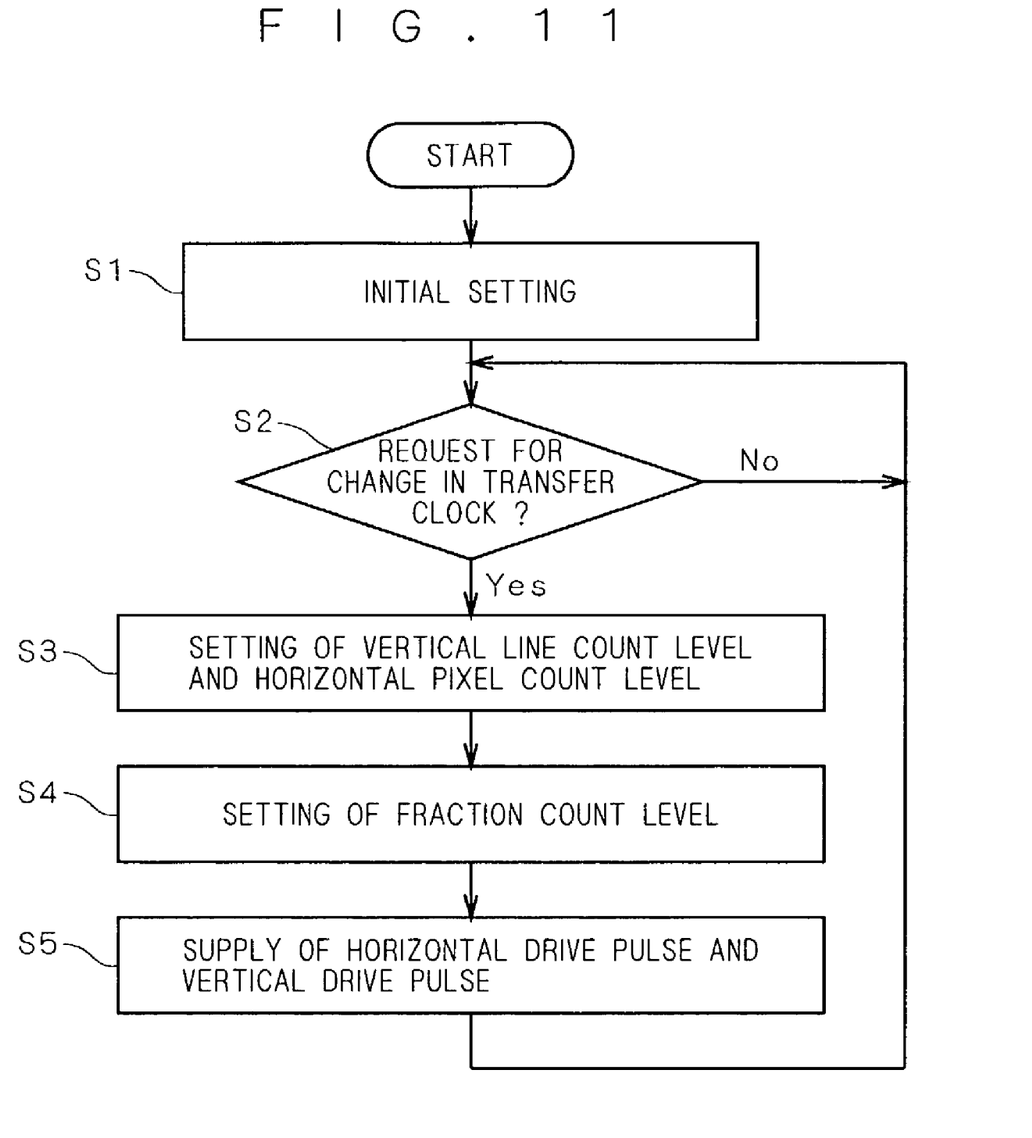
FIG. 11 is a flow chart illustrating processes performed when a system frequency used in an image capture apparatus is changed according to the fourth preferred embodiment of the present invention.

Next, FIG. 11 is a flow chart illustrating processes performed when the transfer clock is changed in the mobile terminal. First, the main system controller 14 initially sets the horizontal pixel count level Nh1, the vertical line count level Nv and the horizontal pixel count level Nh0 serving as the fraction count level in the image-capture system controller 12 upon supply of a power to the mobile terminal (step 1). Thereafter, the image-capture system controller 12 keeps waiting until a request for change in the transfer clock is made by the main system controller 14 (step 2).

When the image-capture system controller 12 receives a request for change in the transfer clock from the main system controller 14, the controller 12 newly sets the horizontal pixel count level Nh1 and the vertical line count level Nv (step 3). Subsequently, the image-capture system controller 12 newly sets the horizontal pixel count level Nh0 as the fraction count level, based on the horizontal pixel count level Nh1 and the vertical line count level Nv as newly set (step 4). The vertical transfer clocks $\phi$ V1 through $\phi$ V4 and the horizontal transfer clocks $\phi$ H1 and $\phi$ H2 are generated based on the horizontal pixel count levels Nh0 and Nh1 and the vertical line count level Nv, each of which is newly set (step 5). Then, the image-capture system controller 12 keeps waiting until a next request for change in the transfer clock which is made by the main system controller 14.

The foregoing operations makes it possible to dynamically prevent a flicker noise in accordance with any of the system frequencies (the frequency of the horizontal transfer clock, for example) used in the image capture apparatus despite a change in any of the system frequencies (the frequency of the horizontal transfer clock, for example) used in the image capture apparatus.

While the invention has been shown and described in detail, the foregoing description is in all aspects illustrative and not restrictive. It is therefore understood that numerous modifications and variations can be devised without departing from the scope of the invention.

What is claimed is:

1. An image capture apparatus comprising:
an image device for photoelectrically converting an incident light which provides an image of a subject, to generate a charge;
a vertical line counter for generating a first count which defines a timing of transfer of said charge generated in said imaging device in a vertical direction;
a horizontal pixel counter for generating a second count which defines a timing of transfer of said charge generated in said imaging device in a horizontal direction; and
a driver for outputting a control signal used for transferring said charge generated in said imaging device based on said first and second counts,
wherein at least one of said vertical line counter and said horizontal pixel counter generates a fraction count used for adjusting a length of one vertical cycle.

2. The image capture apparatus according to claim 1, wherein said horizontal pixel counter changes a threshold value for resetting said second count for a stage of said fraction count generated by said vertical line counter, thereby to adjust a maximum fraction count number.

3. The image capture apparatus according to claim 1, wherein
said vertical line counter does not generate said fraction count, and
said horizontal pixel counter changes a threshold value for resetting said second count, thereby to generate said fraction count and adjust a maximum fraction count number.

4. The image capture apparatus according to claim 1, wherein said vertical line counter and said horizontal pixel counter adjust a maximum fraction count number such that said length of one vertical cycle is set so as to maintain 20 fps or 20/2m (m is an integer) fps.

5. The image capture apparatus according to claim 1, wherein said driver does not output said control signal for transferring said charge in a stage of said fraction count.

6. The image capture apparatus according to claim 1, wherein said image capture apparatus is provided with an electronic shutter function for arbitrarily controlling a period of time during which said charge is generated in said imaging device.

7. A mobile terminal comprising:
said image capture apparatus as recited in claim 1;
a main system controller for outputting a request for change in a system frequency used in said image capture apparatus to said image capture apparatus; and
a main signal processor for receiving an image signal output from said image capture apparatus and performing a predetermined signal processing on said image signal,
wherein said image capture apparatus newly sets respective maximum count numbers which said first and second counts are to reach and a maximum fraction count number which said fraction count is to reach, in accordance with said request for change output from said main system controller.

8. The mobile terminal according to claim 7, wherein said mobile terminal has a capability of radio communications.

* * * * *